United States Patent [19]

Ito et al.

[11] Patent Number: 4,601,635
[45] Date of Patent: Jul. 22, 1986

[54] MULTILINK-TYPE ROBOT

[75] Inventors: Teruyuki Ito, Nagoya; Osamu Toyama, Kariya, both of Japan

[73] Assignee: Toyoda Koki Kabushiki Kaisha, Kariya, Japan

[21] Appl. No.: 491,172

[22] Filed: May 3, 1983

[30] Foreign Application Priority Data

May 14, 1982 [JP] Japan .................................. 57-82135

[51] Int. Cl.$^4$ .............................................. B66C 1/00
[52] U.S. Cl. ..................................... 414/730; 901/15; 901/26; 414/735
[58] Field of Search ................... 414/727, 744 R, 735, 414/730; 901/15, 21, 26, 18, 28, 50

[56]  References Cited

U.S. PATENT DOCUMENTS

| 2,933,205 | 4/1960 | MacDonald et al. | 901/28 X |
| 3,033,059 | 5/1962 | Melton et al. | 901/15 X |
| 3,631,737 | 1/1972 | Wells | 901/28 X |
| 3,712,481 | 1/1973 | Harwood | 901/28 X |
| 3,826,383 | 7/1974 | Richter | 901/18 X |

FOREIGN PATENT DOCUMENTS 0044737  1/1982  European Pat. Off. .......... 901/21 X

*Primary Examiner*—Leslie J. Paperner
*Assistant Examiner*—Dennis Williamson
*Attorney, Agent, or Firm*—Oblon, Fisher, Spivak, McClelland & Maier

[57] ABSTRACT

A multilink-type robot includes an arm support pivotably mounted on a base for angular movement about a vertical axis, the arm support having a pair of side support ledges extending upwardly with a U-shaped recess defined therebetween and extending substantially the entire length of the arm support, a first shaft extending across the recess and having opposite ends rotatably supported on the support ledges, a second shaft rotatably supported on the arm support in coaxial relation to the first shaft for relative rotation with respect to the first shaft, a first arm having one end fixed to the first shaft, a third shaft rotatably supported on an opposite end of the first arm in parallel relation to a first shaft, first rotation transmission for transmitting rotation of the second shaft to the third shaft, a second arm having one end fixed to the third shaft, a fourth shaft rotatably supported on an opposite end of the second arm in parallel relation to the third shaft, a wrist unit fixed to the fourth shaft, and a first and second arm driving mechanism for driving the first and second shafts, respectively, the first and second arm driving mechanism including first and second servomotors, respectively, having output shafts extending in mutually opposite directions and positioned downwardly of a bottom of the recess in the arm support in parallel relation to the first shaft, the output shafts being connected to the first and second shafts, respectively.

2 Claims, 6 Drawing Figures

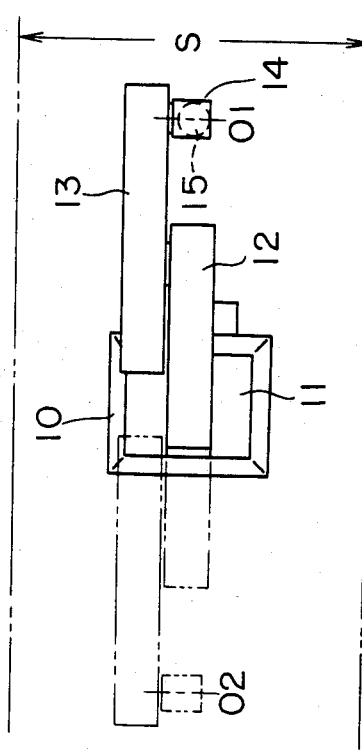
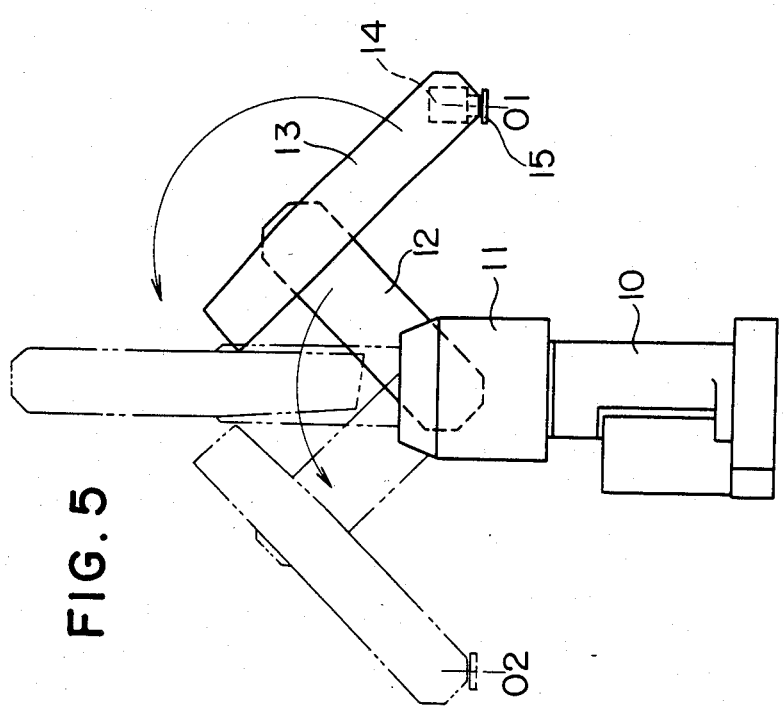
FIG. 6
FIG. 5

MULTILINK-TYPE ROBOT

BACKGROUND OF THE INVENTION

1. Field of the Invention

The present invention relates to a multilink-type robot capable of a plurality of articulatons.

2. Description of the Prior Art

Known multilink-type robots comprise an arm support swingable about a vertical axis, a first arm pivotably supported on the arm support, a second arm pivotably supported on the first arm, and a wrist unit pivotably supported on the second arm at a distal end thereof. It is necessary to stabilize such a robot and increase the rigidty of the supporting structure of each support arm. One better way of meeting this requirement is to install both servomotors for turning the first and second arms on the arm support, thus reducing the weight of the first and second arms, and to have a first arm pivot shaft supported at both ends on the arm support.

Robots of the above configuration are well known in the art. In the conventional robots however no special consideration has been given to the installation of the servomotors on the arm support. Some robots have their servomotors projecting laterally on the arm support, and hence take up a relatively large space for installation. With other robots, the range in which the first arm can swing with respect to the arm support is limited to an angle of 90° between a vertical position and a horizontal position.

The multilink-type robots are generally required to provide wires and tubes such as hydraulic tubes for drive units or other accessaries on the robot. These wires and hydraulic tubes are exposed to the exterior and should be covered this arrangement makes the robot relatively large in size and restricts the ranges of motions of the parts of the robots.

SUMMARY OF THE INVENTION

With the prior difficulties in view, it is an object of the present invention to provide a multilink-type robot which is compact in construction, stable in operation, and allows for a wide range of motion for robot arms.

Another object of the present invention is to provide a multilink-type robot having hollow shafts with wires and hydraulic tubes inserted therein and protected against damage.

According to the present invention, a multilink-type robot comprises a base, an arm support pivotably mounted on the base for angular movement about a vertical axis, the arm support having a pair of side support ledges extending upwardly with a U-shaped recess defined therebetween and extending through substantially the entire length of the arm support, a first shaft extending across the recess and having opposite ends rotatably supported on the support ledges, a second shaft rotatably supported on the arm support in coaxial relation to the first shaft for relative rotation with respect to the first shaft, a first arm having one end fixed to the first shaft, a third shaft rotatably supported on an opposite end of the first arm in parallel relation to the first shaft, first rotation transmission means for transmitting rotation of the second shaft to the third shaft, a second arm having one end fixed to the third shaft, a fourth shaft rotatably supported on an opposite end of the second arm in parallel relation to the third shaft, a wrist unit fixed to the fourth shaft, and first and second arm driving means for driving the first and second shafts, respectively, the first and second arm driving means comprising first and second servomotors, respectively, having output shafts extending in mutually opposite directions and positioned downwardly of a bottom of the recess in the arm support in parallel relation to the first shaft, the output shafts being connected to the first and second shafts, respectively. The shafts are hollow to allow wires and tubes to pass therethrough from the arm support to the wrist unit.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 5 and 6 are side and plan views respectively of the multilink-type robot in operation.

DETAILED DESCRIPTION OF THE PREFERRED EMBODIMENT

Figure 1:
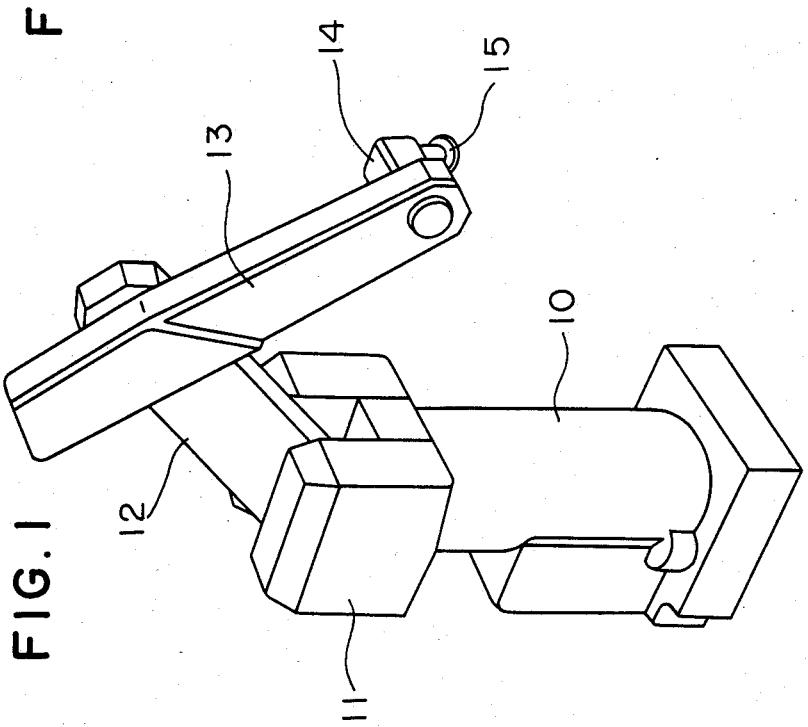
FIG. 1 is a perspective view of a multilink-type robot according to the present invention.

As illustrated in FIG. 1, a multilink-type robot capable of a plurality of articulations according to the present invention includes a base 10, an arm support 11 supported on the base 10 for swinging movement about a vertical axis, a first arm 12 pivotably supported on the arm support 11 for angular movement about a horizontal axis, and a second arm 13 pivotably supported on the first arm 12 for angular movement about an axis parallel to the horizontal axis of angular movement of the first arm 12. A wrist unit 14 is pivotably supported on a distal end of the second arm 13 for angular movement about an axis parallel to the axis of angular movement of the second arm 13. The wrist unit 14 has a tool attachment seat 15 rotatably supported thereon for rotation about an axis normal to the axis of angular movement of the wrist unit 14. A handling unit, a welding torch, or other device is attachable to the tool attachment seat 15 to meet a desired application of the robot.

The parts of the multilink-type robot of the foregoing general construction will be described in more detail.

Figure 3:
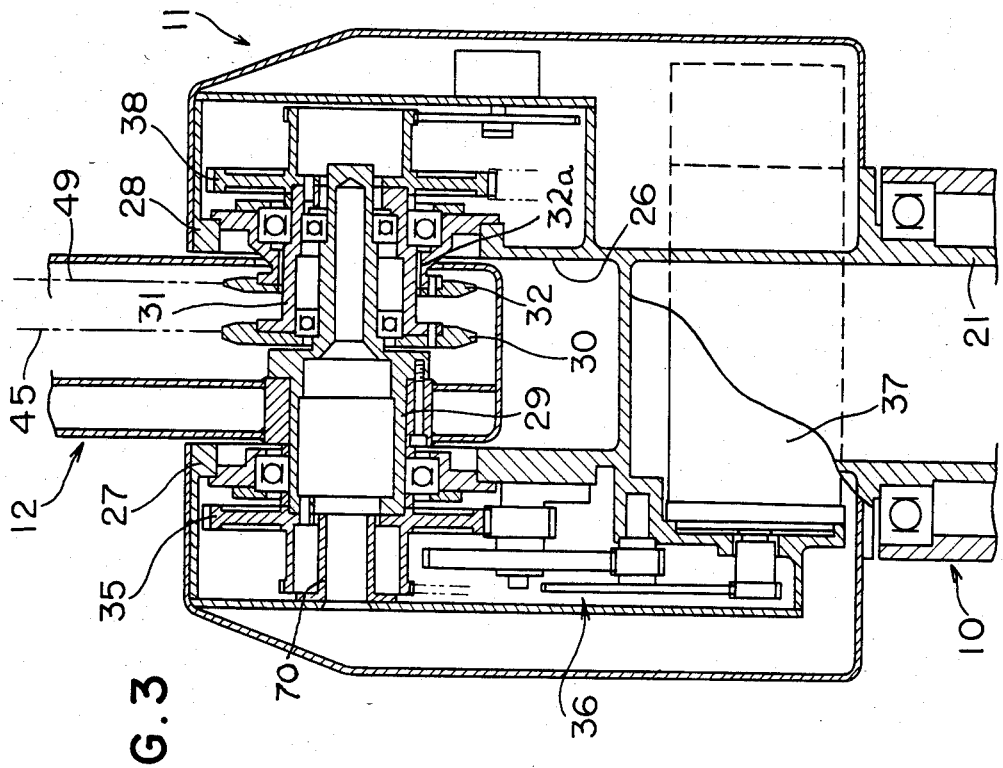
FIG. 3 is an enlarged cross-sectional view of the support construction of a first arm of the robot of FIG. 1.
Figure 2:
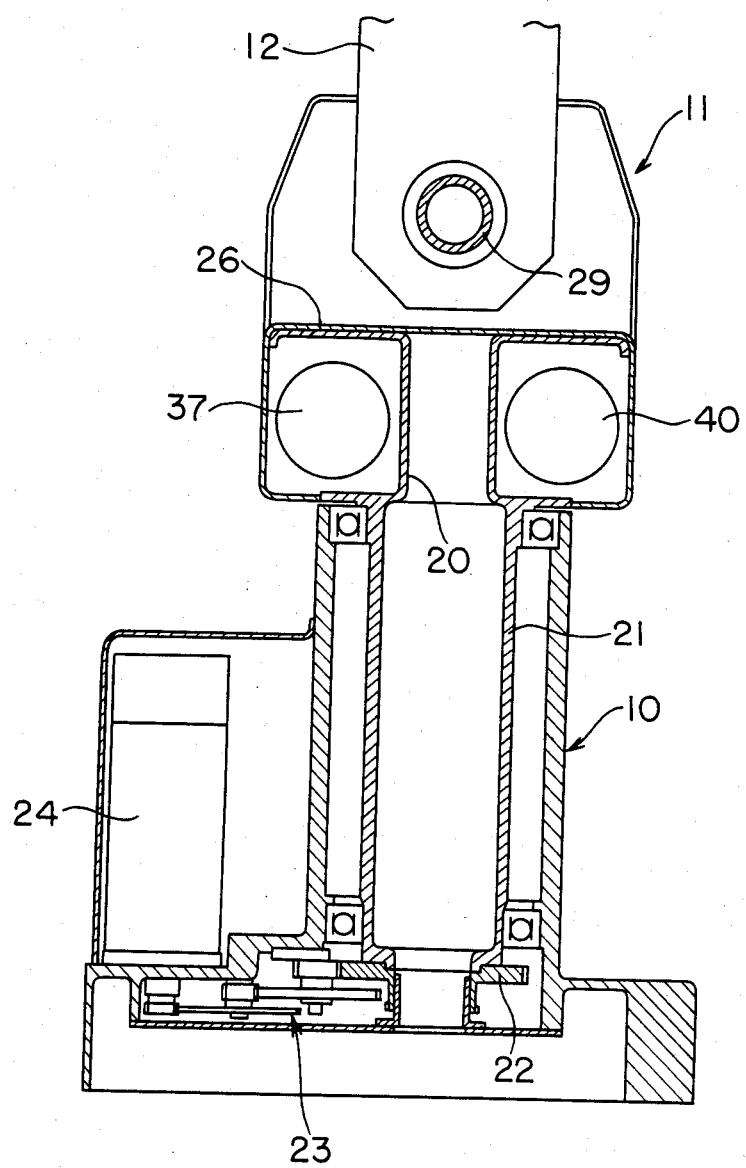
FIG. 2 is an enlarged cross-sectional view of the support construction of an arm support of the robot shown in FIG. 1.

As illustrated in FIGS. 2 and 3, the arm support 11 includes a support body 20 having an upper portion of a substantially U-shaped cross section. The support body 20 also has a lower hollow shaft portion 21 rotatably journalled in the base 10 for rotation about the vertical axis. A gear 22 is fixed to a lower end of the hollow shaft portion 21 and operatively coupled through a speed reduction gear mechanism 23 to a servomotor 24 mounted in the base 10 for turning the arm support 11.

The support body 20 has an upper recess 26 extending through the entire length of the arm support 11 in a direction normal to the vertical axis, the upper recess 26 being located between a pair of support ledges 27, 28, as shown in FIG. 3. A first shaft 29 has one end rotatably journalled in the support ledge 27 for rotation about a horizontal axis. The other end of the first shaft 29 projects across the recess 26 into the support ledge 28. A second shaft 31 with a first sprocket 30 mounted thereon is rotatably journalled in the support ledge 28 in concentric relation to the first shaft 29. The other end of the first shaft 29 is relatively rotatably journalled in the second shaft 31 in coaxial relation. A second sprocket 32 is fixedly mounted on the support ledge 28 in concentric relation to the first shaft 29.

The first arm 12 has one end disposed in the recess 26 and secured to the first shaft 29. To said one end of the shaft 29, there is fixed a gear 35 operatively coupled through a speed reduction gear mechanism 36 to a servomotor 37 mounted in the support body 20 for turning the first arm 12. The second shaft 31 supports on an end thereof remote from the gear 35 a gear 38 operatively coupled through a speed reduction gear mechanism (not shown) disposed in symmetric relation to the speed reduction gear mechanism 36 to a servomotor 40 (FIG. 2) mounted in the support body 20 for turning the second arm 13.

As shown in FIG. 2, the servomotors 37, 40 are disposed below the recess 26 on opposite sides in the arm support 11 and extend parallel to the shafts 29, 31 in oppositely facing relation. The servomotors 37, 40 are thus neatly housed in the arm support 11 without causing the latter to have projections due to these servomotors. The arm support 11 is constructed such that the first arm 12 can turn through about 180° between diametrically opposite horizontal positions.

Figure 4:
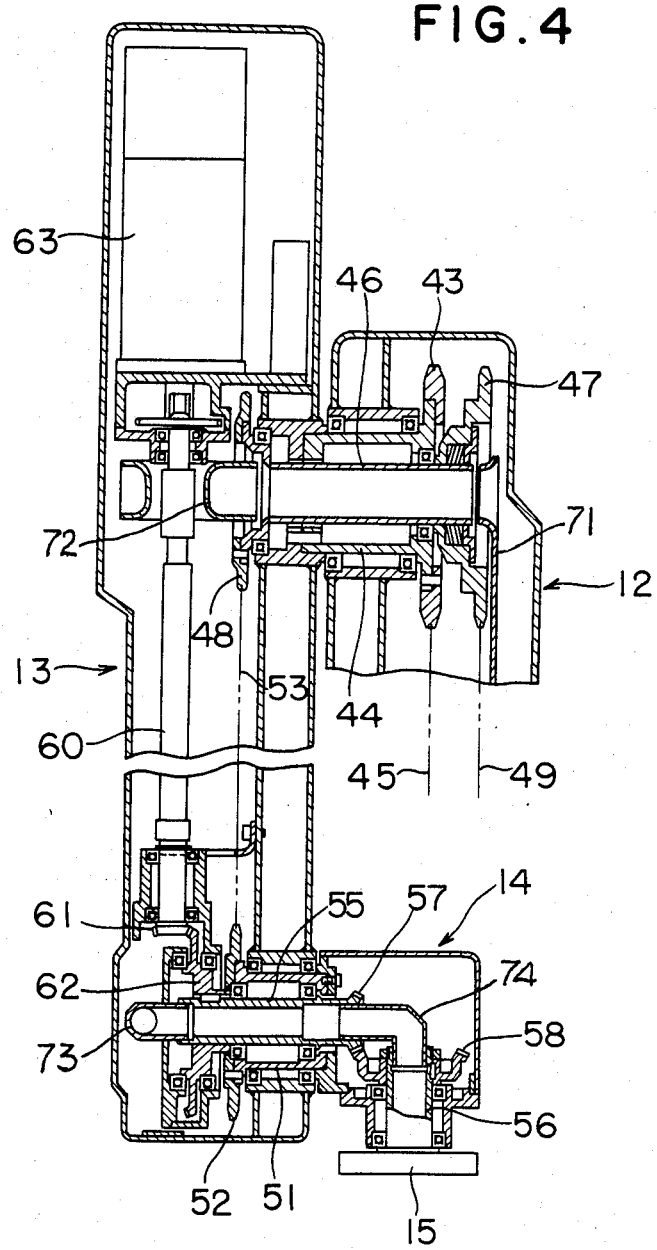
FIG. 4 is an enlarged fragmentary cross-sectional view of the support structures of a second arm and a wrist unit.

Referring to FIG. 4, the other end of the first arm 12 fixed to the first shaft 29 accommodates therein a third shaft 44 rotatably journalled for rotation about an axis parallel to the first shaft 29. A third sprocket 43 is mounted on the third shaft 44 and operatively coupled to the first sprocket 30 through a chain 45 trained therearound. An intermediate shaft 46 extends concentrically through and is rotatably journalled in the third shaft 44. The intermediate shaft 46 has on its opposite ends fourth and fifth sprockets 47, 48 secured thereto. The fourth sprocket 47 has a diameter which is the same as the diameter of the second sprocket 32. The second and fourth sprockets 32, 47 are operatively coupled to each other by a chain 49 trained therearound.

The second arm 13 has one end affixed to an end of the third shaft 44 which projects out of the first arm 12. A fourth shaft 51 is rotatably journalled in the other end of the second arm 13 for rotation about an axis parallel to the axis of the third shaft 44. The wrist unit 14 is secured to a projecting end of the fourth shaft 51. A sixth sprocket 52 is fixed to the fourth shaft 51 and has a diameter equal to that of the fifth sprocket 48. The fifth and sixth sprockets 48, 52 are operatively interconnected by a chain 53 trained therearound. The second, fourth, fifth and sixth sprockets 32, 47, 48, 52 and the chains 49, 53 serve to keep the wrist unit 14 in constant posture at all times independently of swinging motions of the first and second arms 12, 13.

A fifth shaft 55 extends concentrically through and is rotatably journalled in the fourth shaft 51. A shaft 56 with the tool attachment seat 15 mounted thereon is rotatably journalled in the wrist unit 14 for rotation about an axis normal to the axis of the fifth shaft 55. The shaft 56 is operatively coupled to the fifth shaft 55 through intermeshing engagement of bevel gears 57, 58. The second arm 13 houses therein a drive shaft 60 extending longitudinally therein and rotatably journalled therein. The drive shaft 60 is operatively coupled to the fifth shaft 55 through intermeshing bevel gears 61, 62. The drive shaft 60 is coupled with a servomotor 63 installed in the second arm 13 for turning the tool attachment seat 14.

The multilink-type robot thus constructed will operate as follows: When the servomotor 24 for turning the arm support 10 is energized, the arm support 10 is turned about the vertical axis through the hollow shaft portion 21. Energization of the servomotor 37 causes the first shaft 29 to turn the first arm 12. When the servomotor 40 is driven, the second arm 13 is turned through the second shaft 31, the sprocket 30, the chain 45, the sprocket 43, and the third shaft 44. The servomotor 63 as energized enables the drive shaft 60, the bevel gears 61, 62, the fifth shaft 55, and the bevel gears 57, 58 to turn the tool attachment seat 15 supported on the wrist unit 14.

In response to swinging motions of the first and second arms 12, 13, the wrist unit 14 mounted on the fourth shaft 51 is turned with respect to the second arm 13 by the chain connector mechanism interposed between the sixth sprocket 52 on the shaft 51 and the fixed second sprocket 32. As a consequence, the wrist unit 14 is kept in a constant posture at all times no matter how the first and second arms 12, 13 are turned.

With the multilink-type robot of the invention, the first shaft 29 with the first arm 12 secured thereto is supported at opposite ends thereof on the arm support 11. The first arm 12 is therefore of a greater rigidity for increased supporting capability as compared with cantilevered support on the arm support 11. The servomotor 40 for turning the second arm 13, as well as the servomotor 37 for turning the first arm 12, is mounted in the arm support 11, with the results that the arms are of a reduced weight and stable in operation. The servomotors 37, 40 are disposed on opposite sides in the arm support 11 below the recess 26 and juxtaposed parallel to the first shaft 29 with mutually opposite orientation. This arrangement eliminates any projection or protuberance on the arm support 11 which would otherwise be formed due to the servomotors 37, 40. The disposition of the servomotors 37, 40 keeps a desired range of turning movement of the first arm 12. Therefore, the first arm 12 can angularly move through about 180° between diametrically opposite horizontal positions across a vertical line passing across the axis of the first shaft 29. The second arm 13 and the wrist unit 14 are supported respectively on the first and second arms 12, 13 in a cantilevered fashion, and are not substantially limited in their angles of swinging movement. Therefore, the robot can operate in a wide space range.

As shown in FIGS. 5 and 6, the wrist unit 14 can be moved between two points 01, 02 (FIG. 5) on opposite sides of the base 10 solely by turning the first and second arms 12, 13 without having to turn the arm support 11. Accordingly, the robot can be used for operations in a limited space S (FIG. 6).

With the foregoing arrangement, the multilink-type robot is compact in construction, stable in operation, and has a wide range of movements.

As illustrated in FIGS. 2 through 4, the components of the robot, such as the base 10, the arm support 11, the first arm 12, the second arm 13 and the wrist unit 14, are coupled by hollow shafts through which wires, hydraulic tubes and other members can extend from one component to other. The hollow shafts have open ends connected to guide sleeves 70-74. The wires and hydraulic tubes coupled to the servomotors or other accessaries mounted in the robot parts can be protected against damage and exposure to the exterior of the robot. The guide sleeves 70-74 can prevent the wires and hydraulic tubes inserted through the hollow shafts from contacting the rotating members mounted on the shafts that rotate relatively to each other.

Although a certain preferred embodiment has been shown and described, it should be understood that many changes and modifications may be made therein without departing from the scope of the appended claims.

What is claimed is:

1. A multilink-type robot, comprising:

a base;

an arm support pivotably mounted on said base for angular movement about a vertical axis and having a pair of side support ledges, said support ledges extending upwardly with a U-shaped recess defined therebetween and extending through substantially the entire length of said arm support;

a first shaft extending across said recess and having opposite ends rotatably supported on said support ledges;

a second shaft rotatably supported on said arm support in coaxial relation to said first shaft for relative rotation with respect to said first shaft;

a first arm having one end fixed to said first shaft;

a third shaft rotatably supported on an opposite end of said first arm in parallel relation to said first shaft;

first rotation transmission means for transmitting rotation of said second shaft to said third shaft;

a second arm having one end fixed to said third shaft;

a fourth shaft rotatably supported on an opposite end of said second arm in parallel relation to said third shaft;

a wrist unit fixed to said fourth shaft; and first and second arm driving means including first and second servomotors for driving said first and second shafts, respectively, said first and second servomotors having respective output shafts extending in parallel relation to said first shaft, but in mutually opposite directions, and being positioned downwardly of a bottom portion of said recess in said arm support so that said first arm is rotatable through a half revolution between first and second horizontal positions opposed diametrically of said first shaft;

wherein said wrist unit further comprises a wrist body fixed to said fourth shaft, a twist shaft supported on said wrist body for rotation about an axis normal to an axis of said fourth shaft and having a tool attachment on one end, and a twist shaft drive unit for rotating said twist shaft with respect to said wrist body; and wherein said twist shaft drive unit further comprises a drive shaft extending longitudinally in said second arm and rotatably supported thereon, a fifth shaft rotatably supported on said fourth shaft and said second arm in coaxial relation to said fourth shaft, a first pair of bevel gears interconnecting said drive shaft and said fifth shaft for gauged rotation thereof, a second pair of bevel gears interconnecting said fifth shaft and said twist shaft for gauged rotation thereof, and a third servomotor mounted on said second arm and coupled to said drive shaft for rotating said drive shaft.

2. A multilink-type robot according to claim 1, wherein said third servomotor is positioned remotely from said fourth shaft with said third shaft being interposed therebetween for thereby reducing a weight imbalance due to said wrist unit supported on said second arm at said opposite end thereof.

* * * * *